United States Patent [19]

Marshall

[11] Patent Number: 5,077,931
[45] Date of Patent: Jan. 7, 1992

[54] FISHING LURE

[76] Inventor: Earl C. Marshall, Sparta, Wis.

[21] Appl. No.: 533,252

[22] Filed: Jun. 4, 1990

[51] Int. Cl.⁵ ............................................. A01K 85/00
[52] U.S. Cl. .................... 43/42.52; 43/42.4; 43/44.8
[58] Field of Search .................... 43/42.52, 42.4, 44.8

[56] References Cited

U.S. PATENT DOCUMENTS

| | | | |
|---|---|---|---|
| 385,913 | 7/1888 | Hunter | 43/44.8 |
| 1,249,342 | 12/1917 | Dahl | 43/44.8 |
| 1,888,641 | 11/1932 | Toepper | 43/42.52 |
| 2,145,283 | 1/1939 | Accetta | 43/42.52 |
| 2,611,987 | 9/1952 | Hagen | 43/42.51 |
| 2,700,240 | 2/1955 | Gibbs | 43/42.52 |
| 3,002,311 | 10/1961 | Kyper | 43/42.52 |
| 3,096,597 | 7/1963 | Dickinson | 43/42.05 |
| 3,359,675 | 12/1967 | Call | 43/44.8 |
| 4,183,164 | 1/1980 | Young et al. | 43/42.09 |
| 4,231,179 | 11/1980 | Hillesland | 43/42.06 |
| 4,432,157 | 2/1984 | Gowing | 43/42.31 |
| 4,470,217 | 9/1984 | Adams | 43/44.8 |
| 4,653,218 | 4/1987 | Margulis | 43/26.2 |
| 4,665,642 | 5/1987 | Steinman | 43/42.52 |
| 4,765,086 | 8/1988 | Schultz | 43/42.52 |

FOREIGN PATENT DOCUMENTS 213319  5/1967  Sweden ................ 43/42.52

*Primary Examiner*—Kurt Rowan
*Attorney, Agent, or Firm*—Andrus, Sceales, Starke & Sawall

[57] ABSTRACT

A spoon-type fishing lure designed for particular use with a pork rind trailer bait, includes a spoon-shaped body member having a concave side and a convex side, rounded leading and trailing edges and an opening for attaching a fishing line; a hook attached to the body member, having a pointed end facing toward the leading edge of the body member and further having at least one trailer bait retaining member positioned on the shank of the hook; and a weed guard, which is a flexible wire-like member connected to the spoon blade and extending generally rearwardly and upwardly toward the leading edge of the body member.

8 Claims, 4 Drawing Sheets

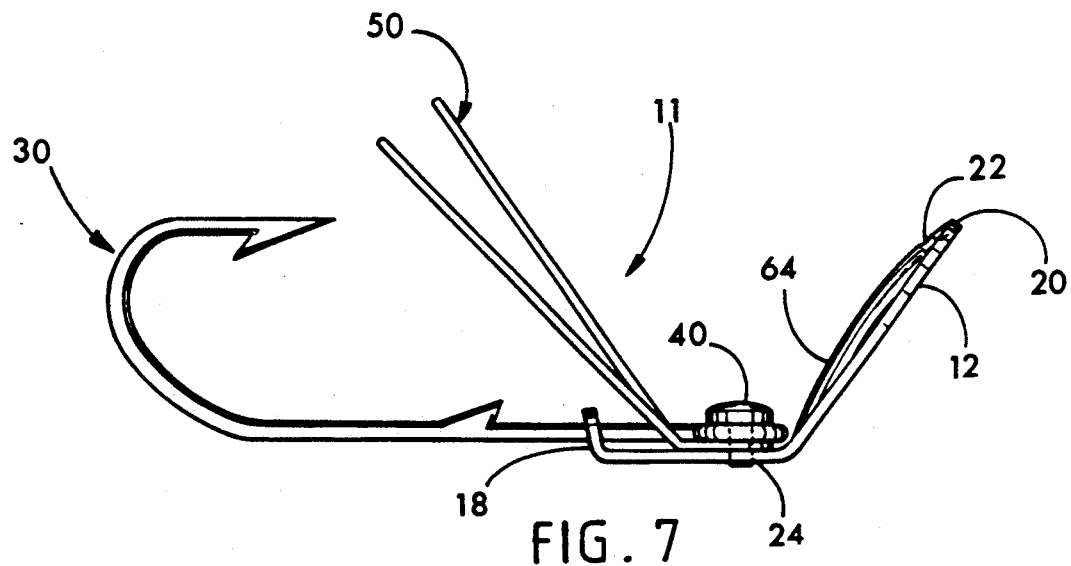
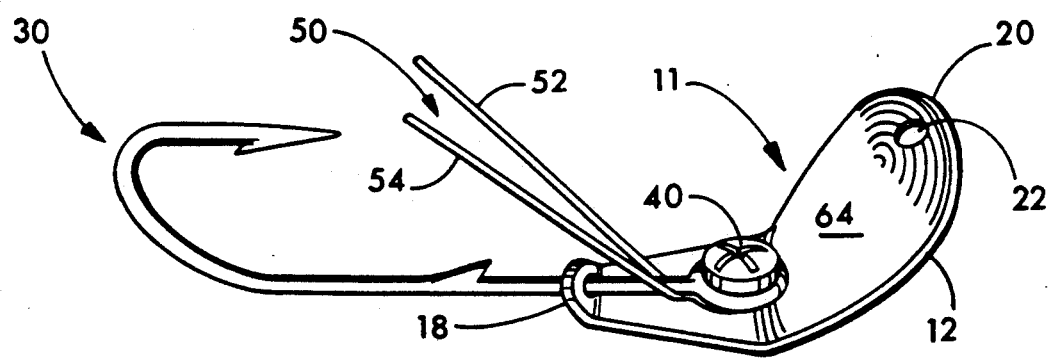
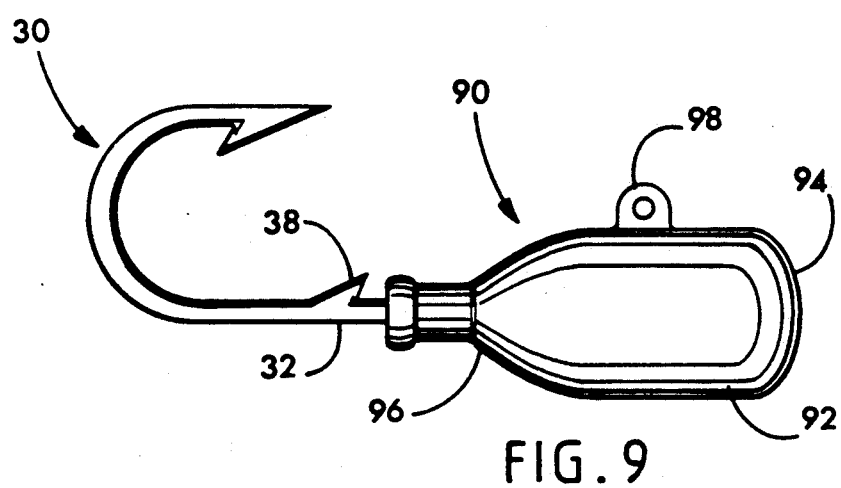

FISHING LURE

FIELD OF THE INVENTION

The present invention is directed to fishing lures and more particularly to an improved spoon-type fishing lure specifically designed for use with many styles of trailer baits, such as pork rind.

BACKGROUND OF THE INVENTION

Artificial fishing lures are an important part of sport fishing. Artificial or man-made lures are designed to simulate a fish's natural food source. The more "life like" the bait, the greater potential for catching a fish. It is generally accepted that fish are harder to catch with artificial bait than with natural, live bait. It is therefore an object of the sport fisherman to develop an artificial lure which provides an overwhelming attraction to the fish.

Artificial lures can be divided into basic types, among them plugs, spoons, jugs, feathers, spinners and soft-plastic lures. Further discussion on each of these lures can be found in Wisner, Bill, *The Fishermen's Source Book* 1983, McMillin Publishing Company, Inc., New York.

Many tournaments, especially bass tournaments, require the use of artificial lures. In fact, there is only one natural bait which may be used in sanctioned bass tournaments: pork rind. According to regulation 7 of the Bass Angler Sportsman Society (BASS) 1987-1988 Bassmaster ® Tournament Official Rules and Regulations: "Only artificial lures may be used. No 'live bait' or 'prepared bait' will be permitted, with the exception of pork strips, rinds, etc. . . . " (Christian, Chris, *Bass Fisherman's Digest,* 1988 DBI Books, Inc., Northbrook, Ill., p. 237).

There are literally hundreds of different artificial lures on the market today. Examples of various lures can be found in the patent literature. For example, U.S. Pat. No. 4,655,642 to Steinman discloses a spoon-type fishing lure including a barbed hook and a weed guard. The hook includes an elongated shank having at one end the eyelet secured to the inner portion of the spoon by a rivet. U.S. Pat. No. 3,096,597 to Dickenson and U.S. Pat. No. 4,183,167 to Young et al. disclose a fishing lure with a removable hook. U.S. Pat. No. 4,432,157 to Gowing discloses a fishing lure in which the hook and weed guard are attached at the same area by a removable screw. U.S. Pat. No. 4,231,179 to Hillesland discloses a lure comprising a hook having additional barbs to hold trailer bait. U.S. Pat. No. 4,653,218 to Margulis and U.S. Pat. No. 2,611,987 to Hagen disclose fishing lures having a rotatable or spinning piece.

While patents are available which disclose one or more desired features of a fishing lure, there are apparently no patents or references which disclose a unique combination of a lightweight spoon, weed guard attached at the front or leading edge of the spoon and a hook with a barb, the lure being specifically designed to have trailer bait attached to it.

SUMMARY OF THE INVENTION

It is therefore an object of the present invention to provide a lure which will attract fish.

It is also an object of the present invention to provide a lure which is easily adapted to accept and use a trailer bait, such as a pork rind.

It is further an object of the present invention to provide an artificial fishing lure having parts which are quickly and easily interchangeable.

The present invention is directed a fishing lure having three distinct features: 1) a spoon-shaped body member, 2) a specially designed hook, and 3) a weed guard. The spoon-shaped body member has a concave side and a convex side, rounded leading and trailing edges, and means to effect fishing line attachment at the leading edge. The trailing edge is generally rounded at a greater radius than the leading edge. The hook is attached to the body member and has a shank extending generally from a centralized position on the body member toward the trailing edge of the body member. The hook has a pointed end facing towards the leading edge of the body member. The hook further has at least one trailer bait retaining member positioned on the shank in such a manner as to retain trailer bait, i.e., pork rinds, artificial plastic lures, etc., during use. The weed guard comprises at least one flexible, wire-like member connected to the body member in a generally centralized position and extends rearwardly and upwardly toward the trailing edge of the body member.

It is within the scope of the fishing lure of the present invention to including a flexible fish attracting skirt on the body member. Further, the fishing lure may include at least one spinner blade removably attached to the body member.

The present invention is also directed to a fishing jig comprising a hard body member having a forward end and a rearward end, the body member including a rounded nose portion on the forward end and a means to effect fishing line attachment near the forward end. The hook is attached to the rearward end of the body member and has a shank extending generally from a centralized position on the rearward end of the body member. The hook has a pointed end facing towards the forward end of the body member and further includes at least one trailer bait retaining member positioned on the shank in such a manner as to retain the trailer bait during use.

Advantageously, the fishing lure of the present invention is designed specifically for use with artificial flexible baits, and particularly with pork rind baits. Heretofore, it was not believed that a fishing lure had been designed specifically for use with pork rind baits.

It is another feature of the present invention to provide a fishing lure in which all of the parts are easily removed. Thus, it will be a simple matter to remove and replace the hook, weed guard, skirt, and/or spinner blade with like devices of different shapes and sizes.

Further objects, features and advantages of the invention will be apparent from the following detailed description when taken in conjunction with the accompanying drawings.

BRIEF DESCRIPTION OF THE DRAWINGS

FIG. 7 is a side plan view of another embodiment of the fishing lure of the present invention illustrating a bent spoon body;

FIG. 8 is a perspective view of the fishing lure of FIG. 7; and

FIG. 9 is a side plan view of a fishing jig of the present invention.

DESCRIPTION OF THE PREFERRED EMBODIMENT

Figure 1:
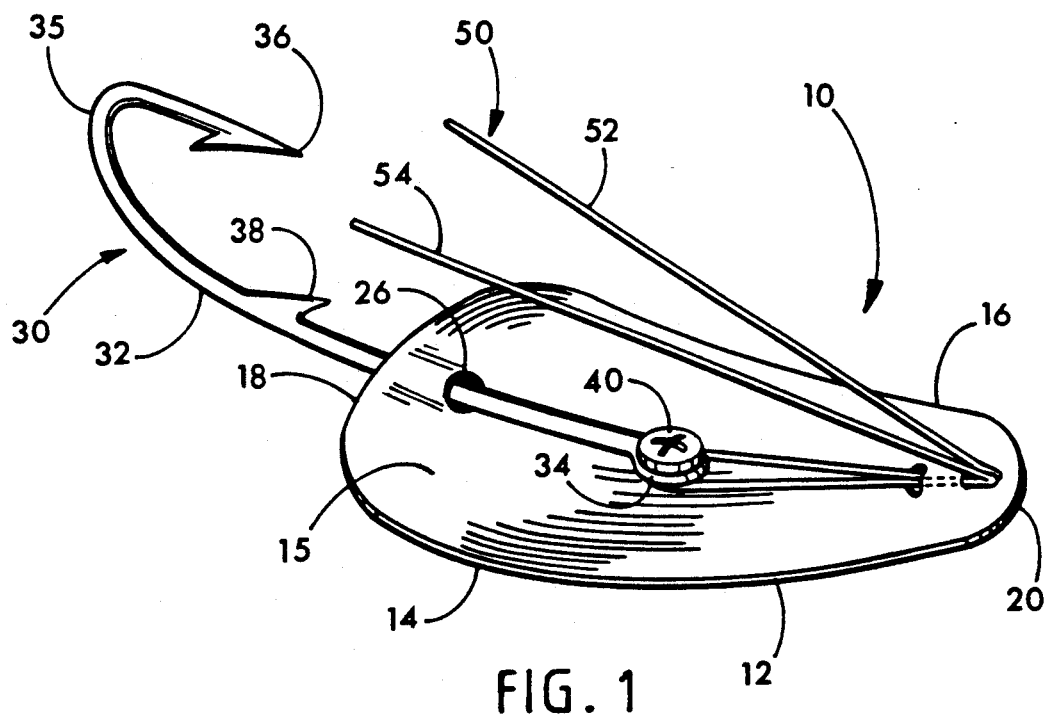
FIG. 1 is a perspective view of one embodiment of the fishing lure of the present invention.
Figure 2:
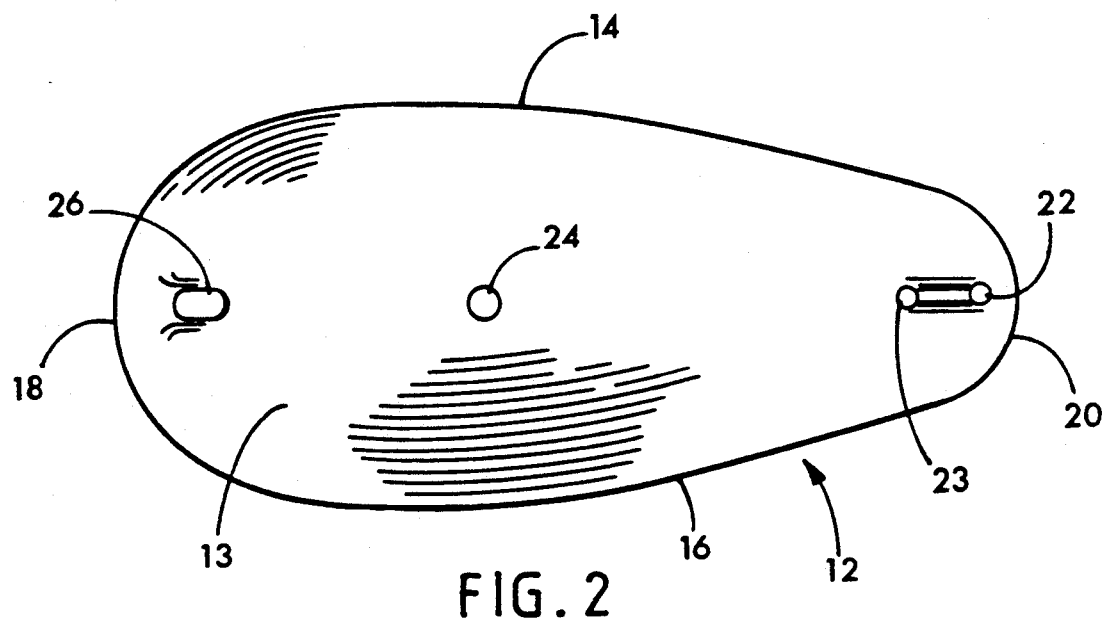
FIG. 2 is a top plan view of a spoon blade used in the fishing lure of the present invention.
Figure 3:
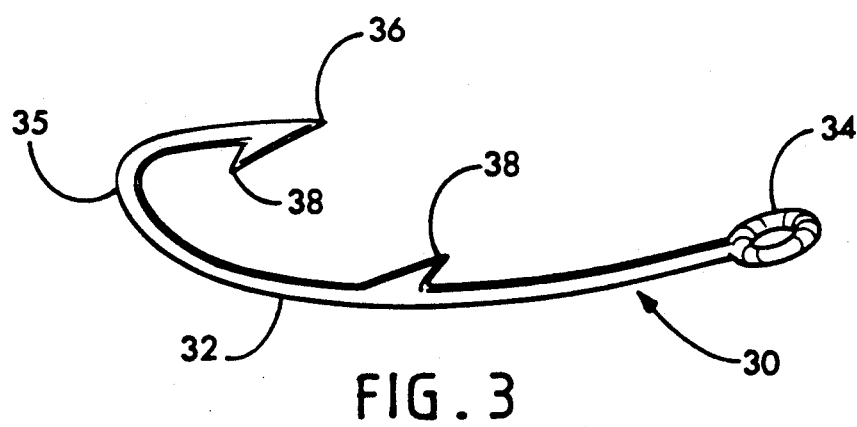
FIG. 3 is a side plan view of a fishing hook used in the fishing lure of the present invention.

Referring now to FIGS. 1-3, wherein like numerals refer to similar parts, reference numeral 10 generally indicates the lure, containing a spoon body portion 12 which has a top side 13, a bottom side 15, curvilinear side edges 14 and 16, a curved trailing edge 18, and a curved leading edge 20.

As illustrated most clearly in FIG. 2, the spoon blade 12 is a generally metal lure comprising a generally oval-shaped body, as viewed from the top, having an eyelet 22 and a weed guard opening 23, to be described later in the specification, near its leading edge 20. The eyelet 22 is principally designed for detachably connecting the lure 10 to a fishing line, not shown. The spoon blade 12 is available in a number of sizes, weights and finishes. Generally, a spoon blade, for sport fishing in freshwater conditions, may weight from ¼ of an ounce or less to two ounces or more. The spoon blade is available in a number of finishes, include plain and polished brass, copper, nickel, gold, striped and lacquered brass. Preferably the spoon blade 12 is of a lightweight variety designed to ride up over very heavy cover. By "very heavy cover" it is meant that the fishing area is a generally weed-filled, congested body of water. The lightweight spoon is designed to be cast such that it can be retrieved over the tops of the vegetation growing on the bottom of the body of water.

The spoon blade 12 of the present invention is also designed with an opening 24 at a position which is substantially centralized between the trailing edge 18, the leading edge 20 and the side edges 14, 16. As will be described in detail further on in this disclosure, the opening 24 has specific use in assisting the attachment of a number of objects, such as hooks, weed guards and skirts.

Located at a position near the trailing edge 18 of the spoon blade 12 ia another, preferably, elongated opening 26. As will be described in more detail hereinafter, the opening 26 is designed to receive and assist in the position of a hook.

Referring now to FIG. 3, reference is made to a fish hook 30 designed for use with the lure 10 of the present invention. The fish hook 30 of the lure 10 may be of any conventional construction herein shown as having a shank 32 terminating at the attachment end thereof by a loop 34 and at the hooked end by a barbed point 36. One or more trailer bait retaining members or rind locks 38 pointed toward the loop 34 are formed along the shank 32 for retaining a trailer bait threaded thereon in the well-understood manner and in desired orientation as hereinafter described. As illustrated in FIG. 1, the hook 30 may be attached to the spoon blade 12 of the lure 10 by placing the hook 30 through the opening 26 and attaching the hook 30 to the spoon blade 12. The attachment may be a permanent, i.e., soldered or welded attachment (not shown), or preferably a removable attachment by threadably inserting a screw or bolt 40 through the loop end 34 of the hook 30 and the opening 24 of the spoon blade 12. In this manner, the hook 30 can be rigidly, but removable attached to the spoon blade 12.

Although there may be a number of final positions in which the hook is associated with the spoon blade, the preferred position is illustrated in FIG. 1 in which the hook 30 is placed such that the bend 35 is contoured along the same angle as the bend in the spoon blade 12. In this manner, the point of the rind lock 38 and the point 36 of the hook are both facing in the direction of the leading edge 20 of the spoon blade 12.

Although one ring lock 38 is illustrated, it is within the scope of the present invention to include two or more rind locks 38 along the shank 32 of the hook 30, as desired. The rind lock 38 is positioned along the shank 32 in such a manner as to retain the trailer bait.

Figure 5:
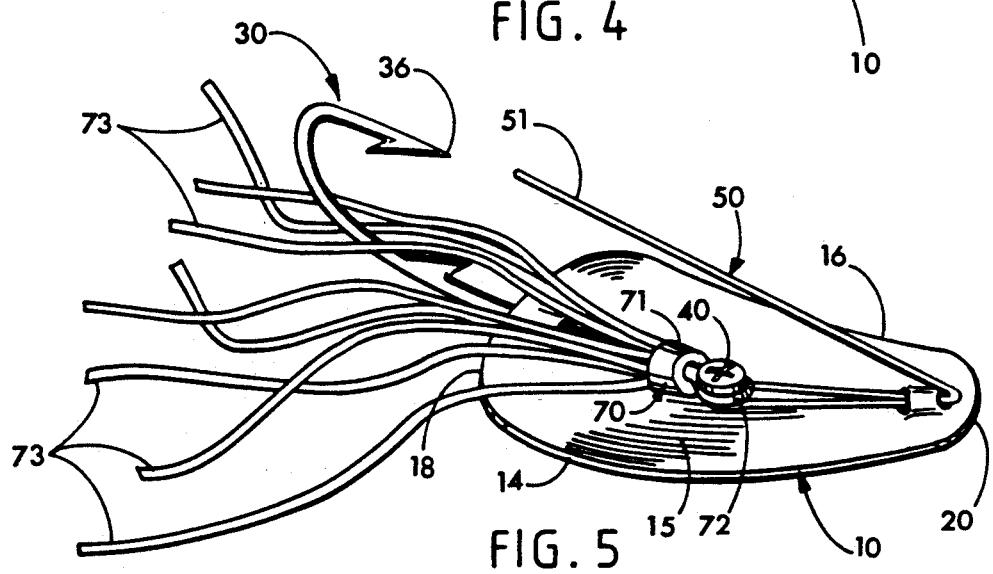
FIG. 5 is a perspective view of the fishing lure of FIG. 1 illustrating a skirt attached.

As illustrated in FIGS. 3 and 5, the fishing lure 10 of the present invention may also be outfitted with a weed guard 50. The weed guard 50 includes one rearwardly and upwardly extending wire-like member 51, as illustrated in FIG. 5, or two rearwardly and upwardly extending wire-like weed guard elements 52, 54 which are secured to the hook 30 at the loop 34 and the spoon blade body 12 at the opening 24 by the retainer element or screw 40. The weed guard elements 52 and 54 extend from the opening 24 along the bottom side 15 of the spoon blade 12 and are threaded through the weed guard opening 23 and eyelet 22. Once the elements 52, 54 have been threaded through the openings 22, 23, the elements 52, 54 are bent at a sharp upward and rearward angle, i.e., in the direction of the point 36 of the hook 30. The rearward and upward position of the elements 52 and 54 are designed to prevent weeds from snagging the barbed end 36 of the hook 30 as the lure 10 is being retrieved during use. The weed guard 50 is very effective because it not only is attached to the spoon blade 12 in a simple manner but it also provides an effective weed retarding mechanism for the lure 10.

Figure 4:
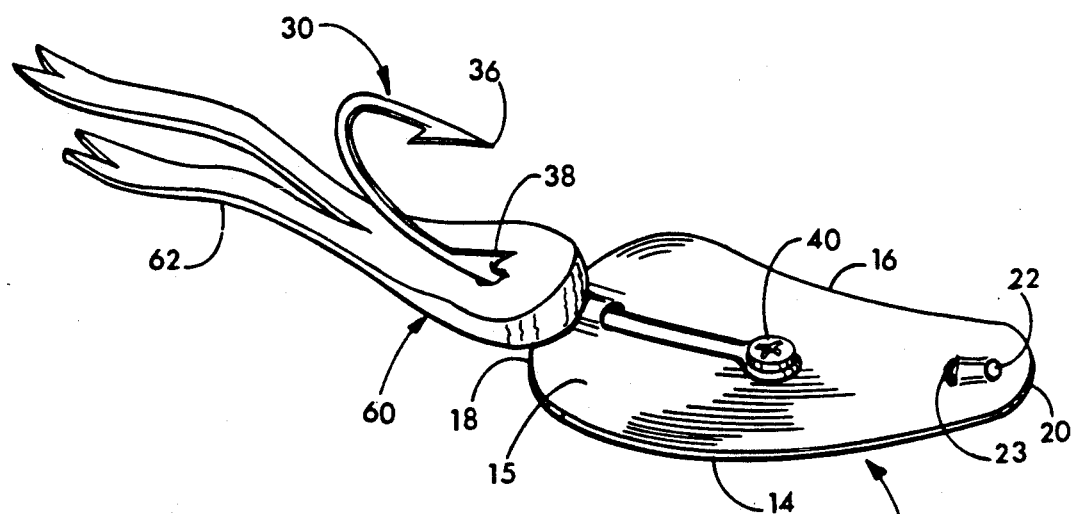
FIG. 4 is a perspective view of the fishing lure of FIG. 1 illustrating a pork rind bait attached.

Referring now to FIG. 4, there is illustrated the preferred embodiment of the lure 10, in which a trailer bait 60, generally comprising a high grade, natural pork skin, has been attached to the hook 30 of the lure 10. Trailer baits come in all shapes, colors and sizes for every fishing condition. They are designed to mimic natural live food of a fish, causing the fish to strike the lure. Examples of trailer bait include pre-punched natural pork rind skins for easy rigging as sold by Uncle Josh Bait Company (Fort Atkinson, Wis.). The trailer bait 60 is attached to the hook 30 in a conventional manner known to the art such that the trailer bait 60 is secured to the hook 30 by means of the rind lock 38. An advantageous feature of the present invention is that the rind lock 38 catches and further secures the trailer bait 60 to the hook 30, as illustrated in FIG. 4. A trailing portion 62 of the trailer bait 60 generally extends from the lure 10 in a flexible, free-floating manner. As the lure is retrieved, the trailing portion 62 undulates through the water in such a manner as to attract fish. Advantageously, the rind lock 38 provides a locking mechanism on the trailer bait 60 thereby securing the trailer bait 60 to the lure 10 in such a manner as to prevent the trailer bait from being accidentally removed from the lure 10.

Referring now to FIG. 5, there is illustrated another embodiment of the lure 10 of the present invention. In this figure, the lure 10 is modified with a conventional skirt 70, generally comprising a base 71 including a loop 72, to which are affixed a plurality of flexible fibers 73. The fibers 73 can be formed of a number of materials including nylon threads, feathers, rubber bands or animal hairs. Although there are a number of conventional ways of attaching the skirt 70 to the lure 10, it is preferred that the skirt 70 be attached to the lure 10 in the same manner as the attachment of the hook 30 and the weed guard 50, i.e., by securing the loop 72 to the opening 24 via the retaining mechanism 40. In this manner, the same retaining mechanism or screw 40 can be tightened over the opening 24 to secure one or more of the hook 30, the weed guard 50 and the skirt 70. The fishing lure 10 of FIG. 5 is also designed to hold a trailer bait 60 in the manner described previously.

Advantageously, the retaining mechanism 40 may be easily removed so that the skirt 70 can be changed if necessary.

Figure 6:
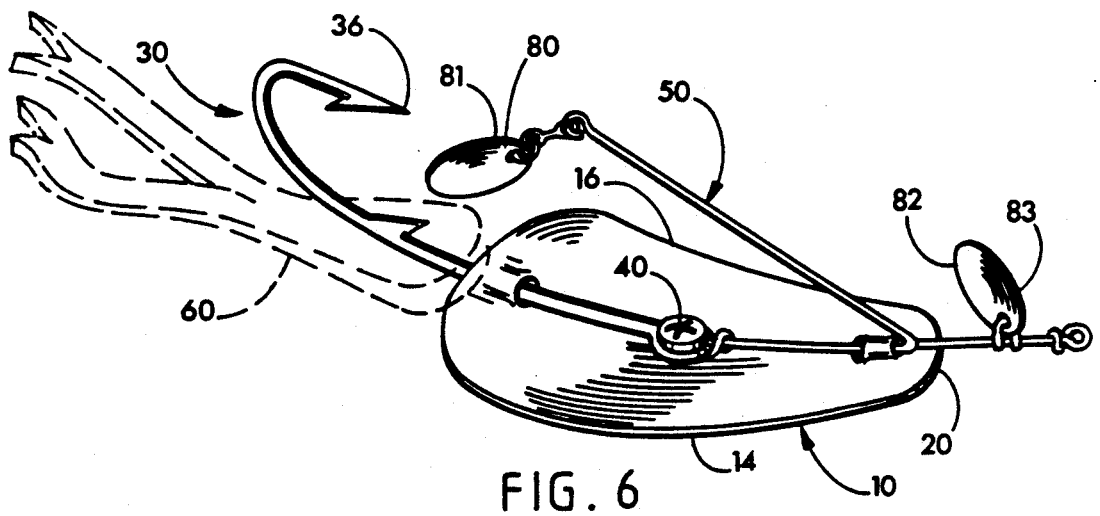
FIG. 6 is a perspective view of the fishing lure of the present invention illustrating spinner blades attached.

Reference is now made to FIG. 6 which illustrates the lure 10 of the present invention with optional spinner blades 80 and 82. The spinner blades 80, 82 comprise a blade body 81, 83 which are designed to swivel in a conventional manner known to the art. As the lure 10 is retrieved or trolled through water at considerable speed, the spinner blade bodies 81, 82 spin. This creates a light flashing or light twinkling effect which is designed to attract fish. The combination of the spinner blades 80, 82 with a trailer bait 60, illustrated in phantom, is designed to provide an uncontrollable attraction to fish.

Reference is now made to FIGS. 7 and 8, which illustrates another embodiment of the fishing lure of FIG. 1, herein designated fishing lure 11. Like the fishing lure 10 of FIG. 1, fishing lure 11 includes a spoon body 12 having a trailing edge 18, a leading edge 20, and side edges 14, 16. The leading edge 20 is characterized by an eyelet 22. The spoon blade 12 of the present invention is also designed with an opening 24 at a position which is substantially centralized between the trailing edge 18, the leading edge 20 and the side edges 14, 16. The trailing edge is characterized by a hook opening 26, through which the shank 32 of the hook 30 is placed. The hook 30 is attached to the spoon body 12 at opening 24 by means of a screw 40 or rivet as described previously.

Unlike the fishing lure 10 of FIG. 1, the fishing lure 11 of FIGS. 7 and 8 is characterized by an upward bend, generally designated at 64. The upward bend 64 in the spoon body 12 of fishing lure 11 causes the lure to move in unique swaying pattern as it is being retrieved. The swaying pattern in combination with the other characteristics which may be added to the lure such as, for example, the trailer bait 60, adds to the fish catching ability of this lure.

As illustrated in FIGS. 7 and 8, a weed guard 50 may be added. Unlike the weedguard 50 illustrated in FIG. 1, the weedguard 50 attached to the fishing lure 11 extends rearwardly and upwardly directly from the opening 24.

Reference is now made to FIG. 9 which illustrates a fishing jig 90 of the present invention. The jig 90 of the present invention, as illustrated in FIG. 9, generally comprises a hard body member 92 of solid metal having a forward end 94 and a rearward end 96. The forward end 94 is generally rounded. Additionally, there is an eyelet or opening 98 for attachment of a fishing line. The hook 30 is attached to the rearward end 96 of the body member 92. The hook 30 is similar to that described previously, with the exception that the shank 32 is embedded in the rearward end 96 of the jig 90. The hook 30 is also characterized by a rind lock 38 for securing a trailer bait 60, not shown. Although not necessary, the jig 90 may preferably include a skirt 70, similar to that illustrated with respect to FIG. 5.

There is thus described and illustrated an improved fishing lure designed to work particularly well with many styles of trailer bait, such as pork rind. This style of fishing lure is particularly beneficial in that it will be useful in sanctioned fishing tournaments most of which only allow artificial lures, including pork rinds.

It is understood that the invention is not confined to the particular construction and arrangement herein illustrated and described, but embraces such modified forms thereof as come within the scope of the following claims.

I claim:

1. A fishing lure comprising:
   a) a spoon-shaped body member having a concave side and a convex side, rounded leading and trailing edges, means to effect fishing line attachment at the leading edge, a hook opening to receive and assist int he positioning of a hook to the body member, a weed-guard opening to receive and assist in the positioning of a weed guard to the body member, and an attachment opening to removably attach the hook and the weed guard to the body member;
   b) a hook removably attached to the body member and having a shank extending generally from a centralized position on the body member toward the trailing edge of the body member, the shank having a bend terminating in a pointed end facing toward the leading edge of the body member, the hook further comprising at least one rind lock integrally formed along the shank between the trailing edge of the body member and the bend in the shank in such a manner as to retain a rind bait during use, wherein the rind lock has a pointed end such that the pointed ends of the hook and the rind lock face in the direction of the leading edge of the spoon; and
   c) a weed guard, comprising at least one flexible, wire-like member removably connected to the body member in a generally centralized position and extending rearwardly toward the trailing edge of the body member and upwardly from the body member.

2. The fishing lure according to claim 1 wherein the body member comprises a metal lure having a generally oval-shaped body.

3. The fishing lure according to claim 1 further comprising the rind bait positioned on the hook and secured by the rind lock.

4. The fishing lure according to claim 1 further comprising a skirt adapted to be mounted on the body member.

5. The fishing lure according to claim 4, wherein the body member comprises means to removably attach the hook, the skirt and the weed guard.

6. The fishing lure according to claim 1 further comprising at least one spinner blade removably attached to the body member.

7. The fishing lure according to claim 1 wherein the spoon body member includes an upwardly extending bend at a position adjacent to the hook attachment position.

8. A fishing lure comprising:

a) a spoon-shaped body member having a concave side and a convex side, rounded leading and trailing edges, means to effect fishing line attachment at the leading edge, a hook opening to receive and assist int he positioning of a hook to the body member, a weed-guard opening to receive and assist in the positioning of a weed guard to the body member, and an attachment opening to removably attach the hook and the weed guard to the body member;

b) a hook removably attached to the body member and having a shank extending generally from a centralized position on the body member toward the trailing edge of the body member, the shank having a bend terminating in a pointed end facing toward the leading edge of the body member, the hook further comprising at least one rind lock integrally formed along the shank between the trailing edge of the body member and the bend in the shank in such a manner as to retain a rind bait during use, wherein the rind lock has a pointed end such that the pointed ends of the hook and the rind lock face in the direction of the leading edge of the spoon;

c) rind bail positioned on the rind lock and extending substantially rearwardly of the hook and body member; and d) a weed guard, comprising at least one flexible, wire-like member removably connected to the body member in a generally centralized position and extending rearwardly toward the trailing edge of the body member and upwardly from the body member.

* * * * *